United States Patent [19]
Liao

[11] Patent Number: 5,359,272
[45] Date of Patent: Oct. 25, 1994

[54] SENSORLESS DRIVE CONTROL AND METHOD FOR DOUBLY-FED RELUCTANCE MOTOR

[75] Inventor: Yuefeng Liao, St. Louis, Mo.

[73] Assignee: Emerson Electric Co., St. Louis, Mo.

[21] Appl. No.: 14,254

[22] Filed: Feb. 5, 1993

[51] Int. Cl.$^5$ ............................................. H02P 1/26
[52] U.S. Cl. ................................... 318/732; 318/701; 318/748; 318/277; 318/787
[58] Field of Search ................ 318/701, 748, 787, 277, 318/732

[56] References Cited

U.S. PATENT DOCUMENTS

| | | | |
|---|---|---|---|
| 4,030,007 | 6/1977 | Price et al. | 318/227 |
| 4,308,491 | 12/1981 | Joyner, Jr. et al. | 318/732 |
| 4,959,573 | 9/1990 | Roberts | 318/748 |
| 5,206,573 | 4/1993 | McCleer et al. | 318/787 |

Primary Examiner—William M. Shoop, Jr.
Assistant Examiner—Karen Masih
Attorney, Agent, or Firm—Polster, Lieder, Woodruff & Lucchesi

[57] ABSTRACT

A doubly-fed reluctance motor (10) has a primary winding set (20) and a secondary winding set (22). A drive control (32) for the motor includes a connection (36) to the primary winding so primary winding current and voltage signals ($i_p$, $V_p$) can be developed. A further signal representing the phase relationship ($\Phi_p$) between the primary winding current and voltage is developed using these signals. A processor module (42) is responsive to these signals to determine the magnitude and phase of a secondary winding current ($I_s$) of the motor for a predetermined motor operating speed ($w_r$). The desired current value is as a function of the primary winding current and the phase relationship between the primary winding current and voltage. A switching module (60) operates to regulate the secondary winding currents and opening and closing of switching elements of the module is controlled by an output from the control module. Operation of the switching module by the control module serves to establish and maintain a desired phase relationship between the primary and secondary winding currents by controlling the feed of current and voltage to the secondary winding set.

17 Claims, 5 Drawing Sheets

FIG. 4B
SECONDARY VOLTAGE

FIG. 4C
POWER FACTOR ANGLE

SENSORLESS DRIVE CONTROL AND METHOD FOR DOUBLY-FED RELUCTANCE MOTOR

BACKGROUND OF THE INVENTION

This invention relates to dynamoelectric machines such as doubly-fed reluctance motors (DERM's) and, more particularly, to a sensorless control scheme for operating such motors.

Despite recent advances in AC adjustable speed drive (ASD) technology, the cost the power converter used in such drives remains the largest contributor to the overall cost of an ASD system. This, in turn, prevents wider industrial applications of these systems. Slip power recovery techniques used in wound-field induction machines have managed to reduce converter ratings and their attendant cost. Applicability of such machines in pump-type applications, where variations in motor speed are limited, would therefore be advantageous. However, the high cost and bulkier size of these wound-field machines, together with the maintenance required for the slip rings used in them, have unfortunately limited their application.

Brushless and cageless wound-field induction motors have been proposed, but these concepts have only recently begun being seriously investigated. It is a feature of these motors to move the secondary motor minding onto the stator. Slip rings are eliminated using this approach; but slip power recovery control, i.e., what is commonly referred to as "double feeding"control, can still be implemented. For pump-type applications, this is an attractive, and cost effective approach. One type motor under consideration is a doubly-fed reluctance motor, or DERM. An advantage of this type motor, which has simple saliency on its rotor, is its structural simplicity. This translates both into a higher efficiency and lower cost motor. In analyzing the performance of DERM's, it has been found that they behave the same as a non-salient synchronous machine, and they can replace existing 1–25Hp. industrial induction motors which operate in the 0–1800Rpm. range. This range is set by limiting the magnetizing inductance of the motor to 2.0–2.5p.u. If a machine is allowed a larger than normal airgap, larger machines can be used. This is particularly useful in sealless pump applications.

SUMMARY OF THE INVENTION

Among the several objects of the present invention may be noted the provision of a low cost, robust drive control for DERM's; the provision of such a drive control which provides an adjustable speed control for a DERM, and at the same time reducing the power converter rating for the motor by approximately one-half; the provision of such a drive control which enables DERM's to be used in residential and industrial ventilator pump and fluid pump applications; the provision of such a drive control which is a sensorless control and which enables both an open-loop, soft-start operational capability; the provision of such a drive control which provides superior performance over conventional induction motor controls in terms of performance stability and disturbance rejection; the provision of such a drive control to utilize terminal variables to obtain rotor position information; the provision of such a drive control to further control secondary winding current with its feedback capability; and, the provision of such a drive control to maintain approximately a 180° phase difference between primary and secondary winding currents to enhance motor performance.

In accordance with the invention, generally stated, a doubly-fed reluctance motor has at least one primary winding and at least one secondary winding for each motor phase. A drive control for the motor includes a connection to the primary winding so a primary winding current signal and a primary winding voltage signal can be developed. Further, a signal representing the phase relationship between the primary winding current and primary winding voltage is developed using these signals. A processing module is responsive to these signals to determine the magnitude and phase of a secondary winding current of the motor for a predetermined motor operating speed. The desired current value is as a function of the primary winding current and the phase relationship between the primary winding current and primary winding voltage. A switching module operates to regulate secondary winding currents and is controlled by an output from the processing module. Operation of the switching module by the control module serves to establish and maintain a desired phase relationship between the primary and secondary winding currents. A method of drive control is also described. Other objects and features will be in part apparent and in part pointed out hereinafter.

BRIEF DESCRIPTION OF THE DRAWINGS

FIGS. 4A–4C are graphs illustrating steady-state motor characteristics under different load conditions where FIG. 4A represents variations in primary current and secondary current, FIG. 4B secondary voltage, and FIG. 4C primary power factor angle;

Corresponding reference characters indicate corresponding parts throughout the drawings.

DESCRIPTION OF A PREFERRED EMBODIMENT

Figure 1:
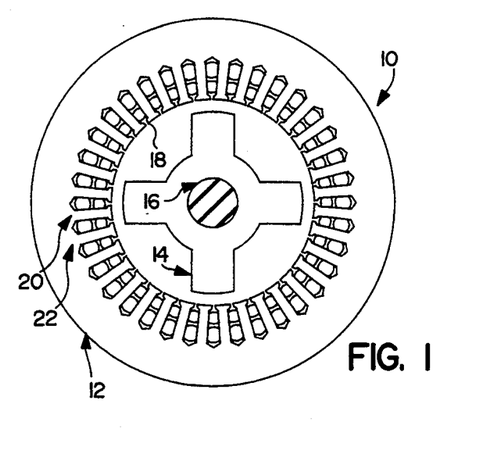
FIG. 1 is a cross-sectional view of a doubly-fed reluctance motor.
Figure 2:
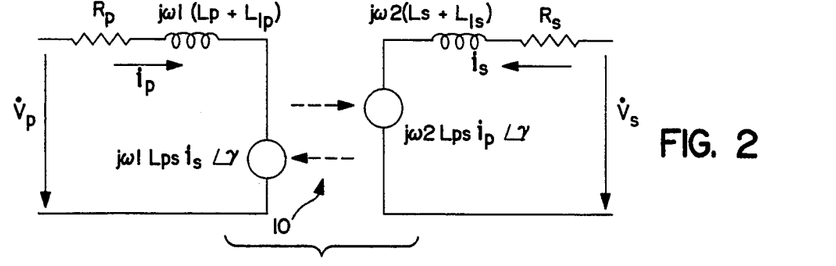
FIG. 2 is a steady-state equivalent circuit for the motor of FIG. 1.

Referring to the drawings, a three-phase, doubly-fed reluctance motor (DERM) is indicated generally 10. As shown in FIG. 1, motor 10 is a 2/6 pole motor having a stator assembly 12, and a rotor 14 mounted for rotation on a shaft 16. A 2/6 motor means that two sets of stator windings are installed in the slots 18 formed in the stator assembly; a set 20 of primary windings which are arranged in a two-pole configuration, and a set 22 of secondary windings which are arranged in a six-pole configuration. It will be understood that these sets of winding arrangements are exemplary only, and that the invention, as described hereinafter, works with other primary and secondary winding arrangements. The equivalent circuit of motor 10 is shown in FIG. 2. In FIG. 2, $V_p$ and $i_p$ represent the primary winding voltage and current, V, and $i_s$ the secondary winding voltage and current, $L_{ps}$, the mutual inductance between the primary and secondary stator windings, and $\gamma$ the torque angle.

Figure 3:
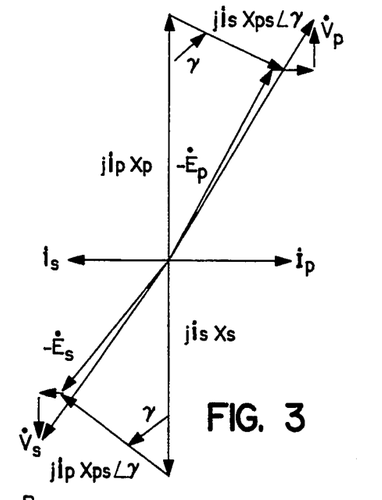
FIG. 3 is a phase diagram for the motor under a steady-state condition and illustrates a desired phase relationship between primary and secondary winding currents of the motor.
Figure 7:
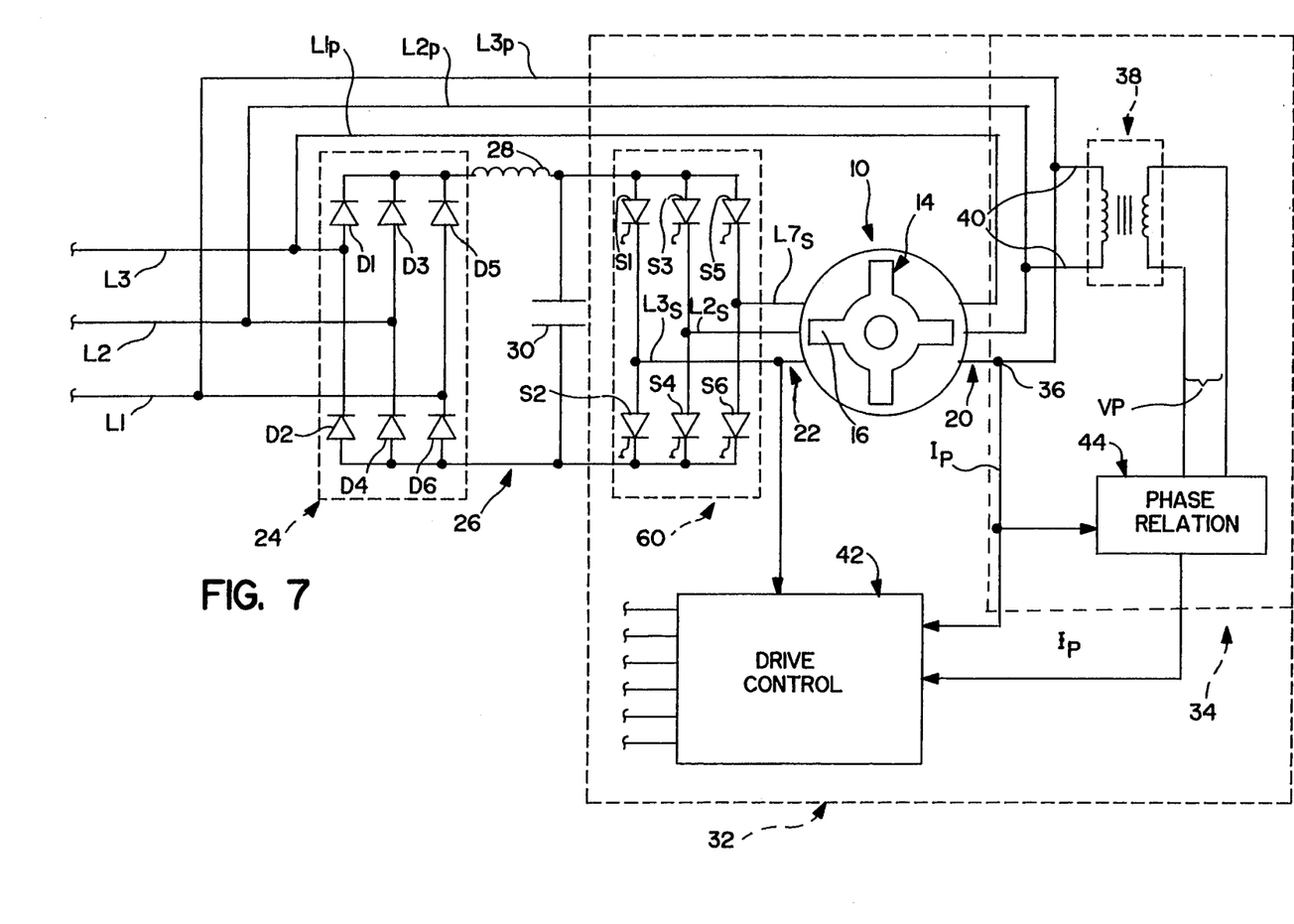
FIG. 7 is a system schematic of a DERM with a drive control of the present invention.

Referring to FIG. 7, 3-phase AC power is supplied to the primary windings via lines L1–L3 respectively. A rectifier circuit 24 comprising diodes D1–D6, and a filter circuit 26 including a parallel connected inductor 28 and filter capacitor 30 function in the conventional manner. If a regenerating capability is desired, diode rectifiers D1–D6 can be replaced by controlled silicon controlled rectifiers (SCR's), also in the conventional manner. A drive control 32 of the present invention is used to establish and maintain a desired phase relationship between the motor's primary winding current and secondary winding current for a desired motor operating speed $w_r$. Since motor 10 is a doubly fed motor, the primary winding set 20 is supplied AC voltage through the lines $L1_p$–$L3_3$. At the same time, the secondary winding set 22 is supplied a rectified, filtered voltage through the lines $L1_s$–$L3_s$. Drive control 32, as described hereinafter, energizes and de-energizes the circuit including the secondary winding set so a secondary winding current is produced which results in the primary/secondary current winding phase relationship. As shown in the phase diagram of FIG. 3, this relationship is 180 electrical degrees.

Drive control 32 first includes a means indicated generally 34 connected to the primary winding set 20 for developing a primary winding current, voltage, and phase signals. Means 34 includes a terminal 36 in one phase the primary winding set at which the primary current signal $i_p$ is produced. A step-down transformer 38 has leads 40 also connected to the primary winding set, these leads being connected across the other two phases of the set from that in which terminal 36 is located. The primary voltage $V_p$ is developed across these leads. Transformer 38 serves to step-down the AC line voltage to the motor to a lower peak value which can be accommodated by the electronic components of the drive control means. The current signal $i_p$ is supplied to both a processing means 42 and to a means 44 which generates a phase signal indicative of the phase relationship between the primary winding current and voltage. Means 44 has, as a second input, the voltage signal developed across the secondary winding of transformer 38. The resultant phase signal $\Phi_p$ produced by means 44 is supplied as a second input to processing means 42. This phase signal is related to torque angle $\gamma$. As such, it represents rotor 14 position in a direct, one-to-one manner. Therefore, the phase signal can be used in lieu of a rotor position signal, as a feedback signal to the control means to control torque angle. This is important from a cost consideration viewpoint, not only because sensors cost money; but also because they take up space and their failure limits the usefulness of the motor.

Figure 8:
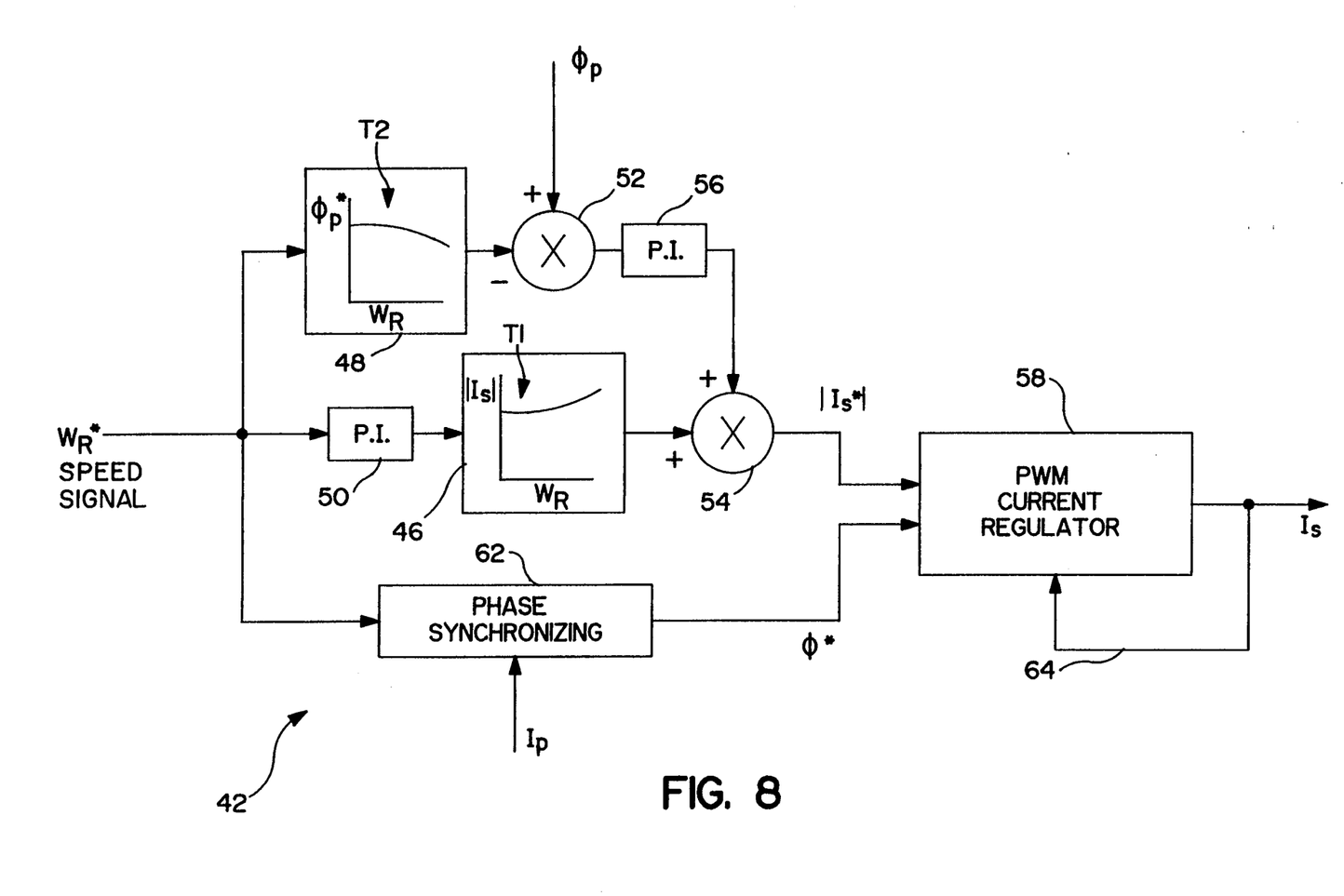
FIG. 8 is a block diagram of the drive control.

Processing means 42 is responsive to these inputs, and a speed signal $w_r^*$, to determine the magnitude and phase of the motor's secondary winding current $i_s$ for a predetermined motor speed represented by the signal $w_r^*$. Signal $Wr^*$ is provided to the processing means by a motor speed controller (not shown) which forms no part of this invention. Referring to FIG. 8, processing means 42 includes first and second scheduling means 46 and 48 respectively. Each scheduling means may be a custom IC such as a programmed read-only-memory (ROM) chip; or, because the control means may be implemented using a software program, as a memory portion of a microprocessor. The motor speed signal representing the desired motor speed is supplied to each scheduling means.

The desired motor speed signal supplied to scheduling means 46 is supplied through a proportional integral controller 50 which, in effect, performs a smoothing operation on the signal. Scheduling means 46 includes a look-up table T1 which includes a value corresponding to the absolute value of the magnitude of the secondary winding current $i_s$ for the desired motor speed. Means 46 supplies an output which is a function of this value. Similarly, scheduling means 48 includes a look-up table T2 which includes a value corresponding to the phase relationship between the primary winding current $i_p$ and primary winding voltage $V_p$ at the desired speed. Means 48 supplies an output which is a function of this value.

The output from scheduling means 48 is provided as one input to a summing means 52. A second input to this summing means is the phase signal from means 44. Processing means 42 includes a second summing means 54 to which the output of scheduling means 46 is supplied. A second input to summing means 54 is the output of summing means 52. The output represents the difference between the actual and desired phase relationship of the primary winding current and voltage. This value is supplied to summing means 54 through another proportional integral control 56. Summing means 54 therefore produces an output which incorporates both the secondary winding current magnitude characteristics, but also the primary winding current/voltage phase relationship.

Processing means 42 further includes a pulse width modulation (PWM) means 58. As shown in FIG. 7, drive control 32 includes a switching means 60 for opening and closing a circuit including secondary winding set 22. Switching means 60 includes a plurality of switching elements S1–S6 which control the application of voltage and current to lines $L1_s$–$L3_s$. In FIG. 7, these switching elements are shown as GTO thyristors. However, they be any gate-turn-off power switching device. The important thing is that their switching is controlled by the output from PWM means 58. As such, they are responsive to the PWM output signal $I_S$ to open and close the secondary winding circuitry.

In addition to the input from summing means 54, PWM means 58 is also provided a phase control signal from a phase synchronizing means 62. The phase synchronizing means has two inputs, one is the desired motor speed signal, and the other is the primary winding current signal. Besides this second input, PWM means 58 further includes a feedback loop or path to facilitate current regulation.

Figure 5A:
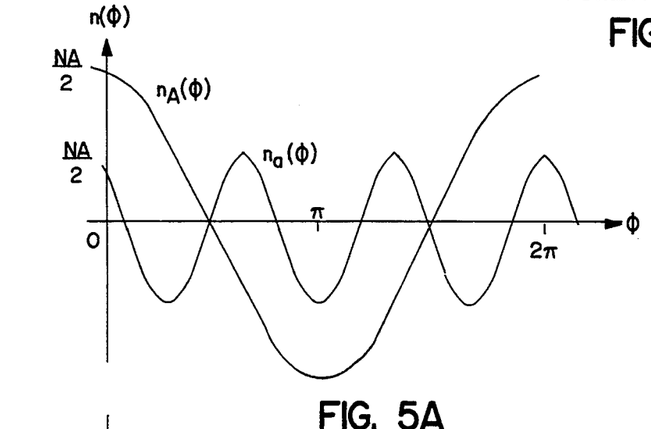
FIGS. 5A and 5B respectively represent variations in winding function for a corresponding phase of the motor primary ($N_A$) and secondary ($N_a$), and inverse air gap ($g^{-1}$)
Figure 5B:
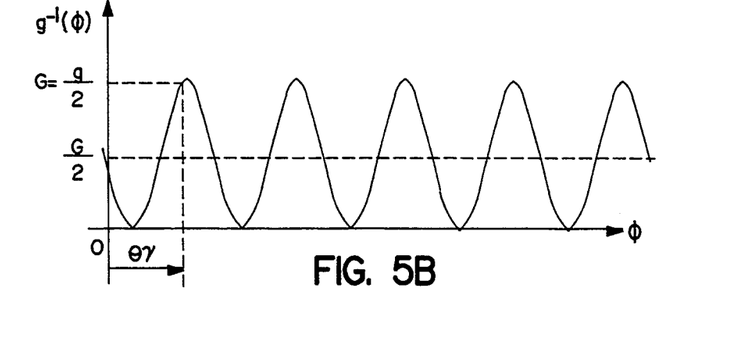
Figure 6A:
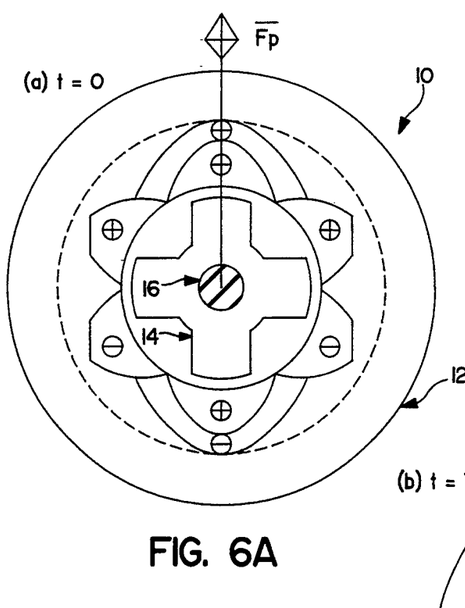
FIGS. 6A and 6B represent airgap field distributions for the motor at a time $t=0$ (FIG. 6A), and at a time $t=T/3$ where T corresponds to the period of primary currents.
Figure 6B:
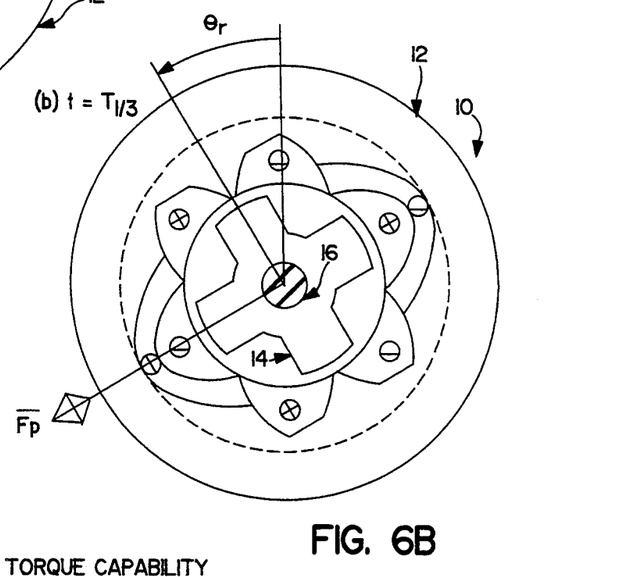

Referring to FIGS. 5A and 5B, the operation of motor 10 is illustrated. In FIG. 5A, the curve $n_A$ ($\Phi$) represents one phase, the A phase of the primary winding. The curve $n_a$ ($\Phi$) represents the A phase of the secondary winding. Further, $N_A$ and $N_a$ represent the respective effective series turns per phase per pole pair. In FIG. 5B, g represents airgap length. $G^{-1}$, the plotted inverse airgap length, can be approximated as a sine wave as shown. Without setting out the equations which relate to the motor as operated herein, it will be understood that if one set of symmetrical sine-wave currents having a frequency $w_1$ and a peak value $I_M$ are flowing in primary winding set 20, another set of currents having a frequency $w_2$ and peak value $I_m$ are flowing in secondary winding set 22. Upon evaluation of the operational characteristics which result from the relationships established under these circumstances, it has been found that:

a) motor 10 behaves like a non-salient synchronous machine with 2(p+q) poles where p and q are the primary and secondary stator winding poles. Saliency on rotor 14 serves to provide magnetic couplings between the two sets 20 and 22 of stator windings. Rotor speed is a function of the frequency of secondary winding currents and variable speed operation of the motor is controlled by controlling the frequency of the secondary winding currents, either closed-loop or open-loop.

b) unlike a synchronous dynamoelectric machine, the two fields established in the two sets of stator windings are not locked into synchronism. However, the two fields are synchronized with respect to an observer of the rotor such that the peaks of the two magneto-motive force (MMF) waves periodically coincide on a pair of rotor poles. This is the condition shown in FIGS. 6A and 6B.

Figure 4A:
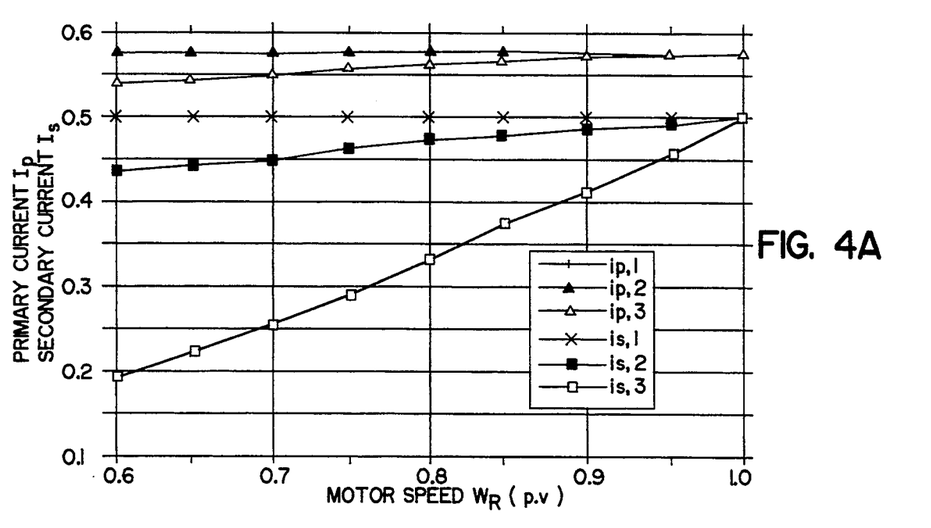
Figure 4B:
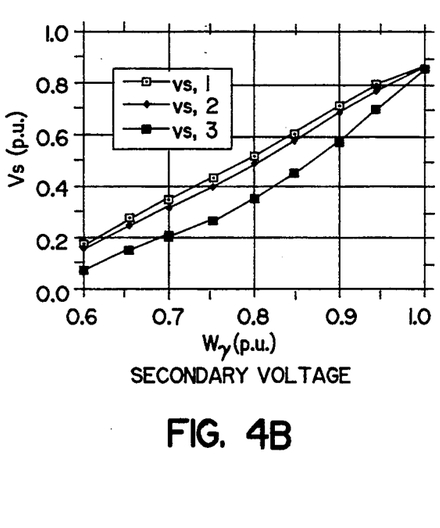
Figure 4C:
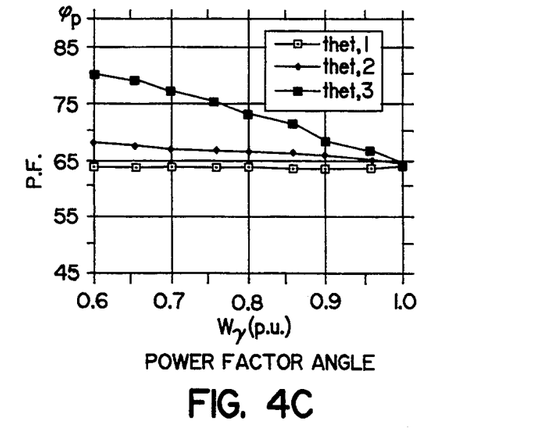
Figure 9:
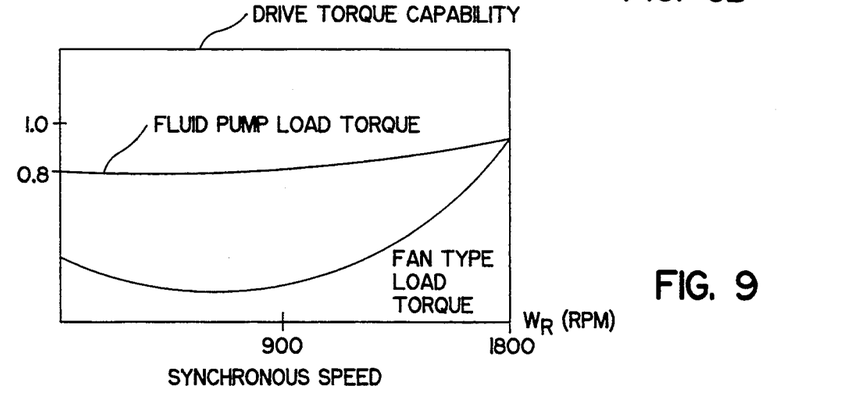
FIG. 9 is a graph of torque vs. speed curves of a DERM using the drive control and a pump-type load.

Referring to FIGS. 4A–4C, various motor 10 operating conditions are shown. The values displayed are steady state values and each is a function of motor operating speed $w_r$. In each plot, the various values are shown on a per unit (p.u.) basis. FIG. 4A illustrates both primary and secondary winding currents for three separate sets of motor operating (load torque) conditions. FIG. 4B illustrates secondary voltage for the same three sets of conditions, and FIG. 4C the power factor angle of the motor primary. From these graphs, it will be understood that active power is generally evenly distributed between the two sets of windings. However, a larger portion of the reactive power is provided through the primary windings. Accordingly, the VA rating for a power converter (i.e. switching means 62) feeding the secondary windings of motor 10 needs to have only a fraction (one-half, for example) of the motor rating. This is important because it means motor 10 can be efficiently utilized in various pump applications where other type motors cannot be. In this latter regard, FIG. 9 illustrates the drive-torque capability of motor 10 compared to a conventional 1-25 hp. induction motor operating at speeds of up to 1800 rpm.

What has been described is a low cost drive control for a DERM. The drive control provides an adjustable speed control for an AC motor, while effectively reducing the power converter rating for the motor by one-half. The drive control particularly enables a DERM to be used in various pump applications and produces advantageous speed/torque characteristics in such applications when compared with conventional motors used in these applications. Of particular importance, the drive control is a sensorless control having an open-loop, soft-start operational capability. In this regard, the drive control utilizes terminal variables to obtain rotor position information, and uses this information to control the motor's secondary winding current in a closed-loop feedback fashion. It is a feature of the drive control employing a control algorithm with this information to maintain approximately a 180° phase difference between the motor's primary and secondary winding currents, the maintenance of this phase relationship over the motor's range of operating speeds serving to produce the enhanced motor performance.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secure by Letters Patent is:

1. A drive control for a doubly-fed reluctance motor having at least one primary winding and at least one secondary winding for each motor phase comprising:
   means connected to the primary winding for developing a primary winding current signal and a primary winding voltage signal, said means including phase means to which said signals are supplied for said phase means to produce a phase signal representing the phase relationship between the primary winding's current and voltage;
   processing means for determining the magnitude and phase of a secondary winding current for the motor when it is operating at a predetermined speed as represented by a speed input signal supplied to the processing means, said processing means including scheduling means to which said speed input signal is supplied, said scheduling means including a look-up table which provides a desired secondary phase relationship for the motor at the predetermined speed as represented by said speed input signal, and said scheduling means providing as an output respective secondary current and secondary phase signals, and said processing means further including summing means for respectively summing said primary phase signal and said secondary phase signal and said secondary current signal and the summed primary and secondary current signals, and phase synchronizing means responsive to said speed input signal and said primary current signal; and, switching means responsive to outputs from said summing means and said phase synchronizing means of said processing means for establishing and maintaining a desired phase relationship between said primary and secondary winding currents, said switching means opening and closing a secondary winding circuit through which said secondary current flows through said secondary winding in response to said processing means outputs.

2. The drive control of claim 1 wherein the motor is a three phase motor and the drive control establishes and maintains the desired phase relationship between the primary and secondary winding currents for each motor phase.

3. The drive control of claim 1 wherein said connected means includes a terminal to which the primary winding is connected and from which primary winding current and voltage signals are supplied to said control means.

4. The drive control of claim 4 further including step-down transformer means interposed between the terminal and the phase means for stepping-down the amplitude of the primary winding voltage signal.

5. The drive control of claim 4 wherein said processing means includes first and second scheduling means to which said speed input signal is supplied, said first scheduling means providing a nominal current signal representing the magnitude of the secondary winding current for the predetermined speed, and said second scheduling means providing a nominal phase signal representing a desired phase relationship between the primary winding current and voltage.

6. The drive control of claim 5 wherein said processing means includes a first summing means to which said phase signal from said phase means is supplied and to which said nominal phase signal from said second scheduling means is also supplied, said summing means providing a phase adjustment output signal representing a degree of phase adjustment between the primary winding current and voltage to obtain the desired phase relationship for the predetermined motor speed.

7. The drive control of claim 6 wherein said processing means further includes a second summing means to which is supplied the phase adjustment output signal of said first summing means and the nominal current signal from said first scheduling means, said second summing means providing as an output a correction signal representing the amount of change required to obtain the desired secondary winding current magnitude.

8. The drive control of claim 7 wherein said processing means further includes pulse width modulation means to which the correction signal is supplied, the pulse width modulation means providing an output to the switching means for the switching means to open and close the secondary winding circuit, and said phase synchronizing means supplies a phase control output to the pulse width modulation means for the pulse width modulation means to control the switching means for secondary winding current phase as well as magnitude.

9. The drive control of claim 11 wherein the pulse width modulation means includes a feedback path for the output it provides to the switching means.

10. The drive control of claim 9 wherein the control means controls the secondary winding circuit so the phase relationship between the primary and secondary winding currents is established and maintained at approximately 180 electrical degrees for the desired motor operating speed.

11. In a three-phase, doubly-fed reluctance motor (DERM) having at least one primary winding and at least one secondary winding for each motor phase, a drive control for establishing and maintaining a desired phase relationship between the primary winding current and secondary winding current of each phase comprising:

terminal means connected to the primary winding of one of the primary phase windings for developing a primary winding current signal;

means connected between the primary windings for the other two phases to develop a primary winding voltage signal;

means to which the primary winding current and voltage signals are supplied for developing a phase signal representing the phase relationship between the primary winding current and primary winding voltage;

processing means for determining a magnitude and phase of a secondary winding current of the motor for a predetermined motor operating speed, said processing means including first and second scheduling means to which a motor speed signal representing a desired motor speed is supplied, said first scheduling means supplying an indication of the magnitude of the secondary winding current when the motor is operated at the desired speed and the second scheduling means supplying an indication representing the phase relationship between the primary winding current and primary winding voltage at the desired speed, the scheduling means each providing an input to respective first and second summing means, said second summing means also having as an input the phase signal, the second summing means providing a second input to the first summing means, and the second summing means providing a control input to a pulse width modulation means representing the magnitude of the secondary winding current at the desired motor speed; and, switching means for opening and closing a secondary winding circuit, said switching means being responsive to an output from said pulse width modulation means for opening and closing said circuit to establish and maintain the desired phase relationship.

12. The drive control of claim 11 wherein the control means further includes phase synchronizing means to which said motor speed signal is also supplied, and to which said primary winding current signal is supplied, said phase synchronizing means supplying a phase control output to the pulse width modulation means for the pulse width modulation means to control the switching means for secondary winding current phase as well as magnitude.

13. The drive control of claim 12 wherein the pulse width modulation means includes a feedback path for the output it provides to the switching means.

14. The drive control of claim 11 wherein the processing means controls the secondary winding circuit so the phase relationship between the primary and secondary winding currents of each phase is established and maintained at approximately 180 electrical degrees for the desired motor operating speed.

15. A method of controlling a doubly-fed reluctance motor to establish and maintain a desired phase relationship between a primary winding current and secondary winding current of the motor at a desired motor operating speed comprising the steps of:

developing a primary winding current signal, a primary winding voltage signal, and a phase signal representing the phase relationship between the primary winding current and primary winding voltage;

being provided a speed signal representing the desired motor operating speed;

obtaining being provided an indication of the magnitude of the secondary winding current from a first scheduling means to which is supplied the speed signal;

obtaining an indication representing of the phase relationship between the primary winding current and primary winding voltage at the desired speed from a second scheduling means to which the speed signal is also supplied;

summing the phase relationship indication and phase signal at a first summing means, and summing the result from the first summing means with the indication of secondary winding current magnitude at a second summing means to obtain a control signal representing the magnitude of the secondary winding current at the desired motor speed; and, supplying the control signal to a switching means to open and close a secondary winding circuit to establish and maintain the desired phase relationship.

16. The method of claim 15 wherein the control signal is supplied to a pulse width modulation means which controls the switching means, and the method further includes obtaining phase synchronizing information based upon the speed signal and primary winding current signal and supplying the phase synchronizing information to the pulse width modulation means for the pulse width modulation means to control the switching means for secondary winding current phase as well as magnitude; and, establishing a feedback path to the pulse width modulation means for an output it supplies to the switching means.

17. The method of claim 16 further including the step of establishing and maintaining the phase relationship between the primary and secondary winding currents at approximately 180 electrical degrees for the desired motor operating speed.

* * * * *